(No Model.)
A. F. STUBBS.
GAFF CHIP FOR VESSELS.
No. 366,274. Patented July 12, 1887.
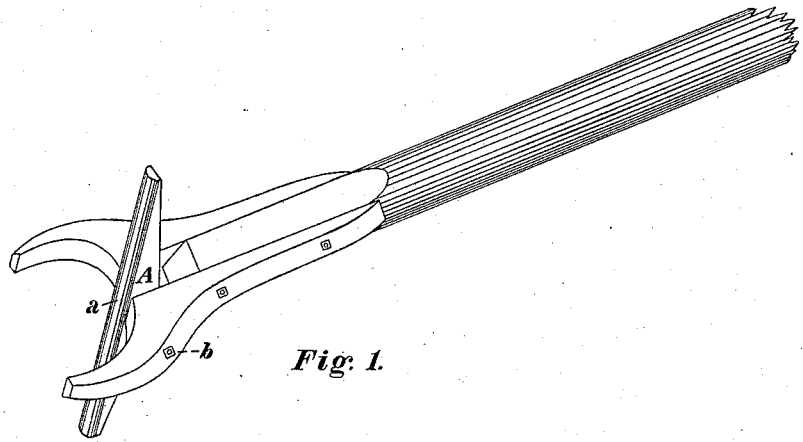
Fig. 1.
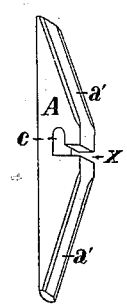
Fig. 2.
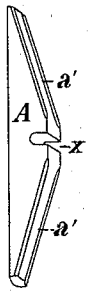
Fig. 3.
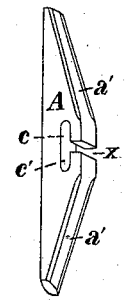
Fig. 4.
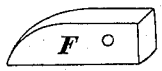
Fig. 6.
Fig. 5.
Witnesses:
P. W. J. Lander
Fred W. Hill
Inventor.
Abel F. Stubbs
By J. R. Mason Atty

UNITED STATES PATENT OFFICE.

ABEL F. STUBBS, OF BANGOR, MAINE.

GAFF-CHIP FOR VESSELS.

SPECIFICATION forming part of Letters Patent No. 366,274, dated July 12, 1887.

Application filed December 7, 1886. Serial No. 220,890. (No model.)

*To all whom it may concern:*

Be it known that I, ABEL F. STUBBS, a citizen of the United States, residing at Bangor, in the county of Penobscot and State of Maine, have invented a new and useful Gaff-Chip; and I do hereby declare that the following is a full, clear, and exact description of the invention, which will enable others skilled in the art to which it appertains to make and use the same.

My invention relates to an improved chip for the gaffs and booms of vessels, and is illustrated in the accompanying drawings, in which—

Figure 1 is a perspective view of gaff with my chip in position. Figs. 2, 3, 4, and 5 are isometric views of different modifications of my chip. Fig. 6 is an isometric view of the chip in common use.

Similar letters refer to corresponding parts throughout the figures.

The gaffs and booms of vessels are commonly fitted with bearing-pieces, technically called "chips," to prevent the wearing of the mast by the jaws of the gaff or boom when the sail is spread or when the gaff is raised or lowered. These chips are usually formed in the shape shown in Fig. 6, and are pierced with a bolt-hole, whereby they are pivoted at the apex of the jaws of the gaff upon a bolt passing horizontally through the bases of the jaws, and, projecting slightly inside the curve of the jaws, present a longitudinal bearing-surface to the side of the mast. The edges of the apex of the jaws are thus prevented from coming in contact with the mast, which is instead borne upon by the flat or convexed surface of the chip, pivoted as described, so as to remain substantially perpendicular and parallel with the mast whatever the inclination of the boom or gaff. The bolt upon which the chip is pivoted is passed through the jaws, as stated, and generally riveted in position, but whether riveted or not frequently becomes so rusted into the wood that when, as often happens, the chip is injured or worn out and a new one is required the bolt cannot be removed without destroying the jaws. It is to remedy this difficulty that I have invented my removable chip. I form my chip A longer than the common chip, F, shown in Fig. 6, with the side $a$ designed to bear upon the mast straight and preferably convexed, and the opposite side, $a'$, chamfered from a point near the center of its length toward both ends, as shown in Figs. 2, 3, and 4, or chamfered downward only, as shown in Fig. 5. Just below the center of the length of the chip I form across its width a horizontal slot, $x$, of sufficient width to receive the chip-bolt $b$, and I prolong the slot at right angles perpendicularly upward, as shown in Fig. 2, so as to form a jaw, $c$, in which the chip-bolt may rest, and the chip be thus prevented from slipping off the bolt. The slot $x$ may also be prolonged at right angles perpendicularly upward and downward, as shown in Fig. 4, forming the jaws $c$ and $c'$, in which case the bolt is received in the jaw $c'$ when the gaff is being lowered, and the chip is thus held in position. The slot $x$ may also be used alone without either jaw $c$ or $c'$, as shown in Fig. 3, although this form would afford more chance for the chip to become unshipped from the bolt.

Either form of my slotted chip can be easily and quickly adjusted upon the chip-bolt, and as easily and quickly detached therefrom without removing the bolt from the jaws. A further, though lesser, advantage is afforded by the removability of the chip from spare or purchase gaffs, as effecting ease and convenience of storage.

By chamfering the rear edge of the chip from the center of its length downward and nearly to a point, the lower end of the chip will, when the sail is lowered, pass inside the hoops securing the edge of the sail to the mast, permit the gaff to lie closely upon the boom, and thus secure a neater stowage of the sails. When formed with the double jaws $c$ and $c'$ and chamfered from the center toward both ends, the chip becomes reversible, and, moreover, by such chamfering greater inclination of the gaff with reference to the mast is permitted than could otherwise be obtained.

Chips of any shape or style can be provided with either of the forms of slot and jaws described, and without the chamfered edge, when desired.

Having thus described my invention, what I claim, and desire to secure by Letters Patent, is—

1. A detachable gaff-chip for the gaffs and booms of vessels, having a straight front face and its rear face formed with a tranverse slot to receive the chip-bolt, substantially as described.

5   2. A detachable gaff-chip for the gaffs and booms of vessels, having a straight front face and its rear face formed with a transverse slot to receive the chip-bolt, and chamfered longitudinally toward its extremities, substantially as described.

ABEL F. STUBBS.

Witnesses:
HARRY D. STEWART,
M. H. WARDWELL.